(12) United States Patent
Shioji

(10) Patent No.: US 6,466,264 B1
(45) Date of Patent: Oct. 15, 2002

(54) DIGITAL CAMERA ACCOMMODATING RECORDING MEDIA FROM OTHER DIGITAL CAMERAS

(75) Inventor: Masahiro Shioji, Neyagawa (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/514,152

(22) Filed: Feb. 28, 2000

(30) Foreign Application Priority Data

Mar. 1, 1999 (JP) .......................................... 11-052744

(51) Int. Cl.$^7$ ........................... H04N 5/225; H04N 5/76
(52) U.S. Cl. ........................................ 348/231; 348/207
(58) Field of Search ................................. 348/231–233, 348/207, 333.11, 333.12, 220; 358/909.1, 906; 386/1, 38, 117, 131

(56) References Cited

U.S. PATENT DOCUMENTS 4,740,828 A * 4/1988 Kinoshita .............. 348/333.11
5,784,572 A * 7/1998 Rostoker et al. .............. 386/39
5,933,572 A * 8/1999 Nagasawa et al. ............ 386/38

* cited by examiner

Primary Examiner—Wendy R. Garber
Assistant Examiner—Rashawn N. Tillery
(74) Attorney, Agent, or Firm—Armstrong, Westerman & Hattori, LLP.

(57) ABSTRACT

A signal recording/reproducing apparatus includes a CCD imager. The still image taken by said CCD imager is recorded, together with resolution information, on a recording medium. The recording medium is recorded, together with resolution information, is a still image taken by said digital camera and having a higher resolution than said CCD imager. When a still image is reproduced from said recording medium and displayed on a monitor, a video encoder converts the resolution of a reproduced still image based on resolution information. The converted resolution agrees with a resolution of the monitor. As a result, a reproduced still image is properly displayed on the monitor.

5 Claims, 12 Drawing Sheets

| | | |
|---|---|---|
| RESOLUTION | SXGA | 1280×960pixel |
| | XGA | 1024×768pixel |
| | VGA | 640×480pixel |
| FRAME RATE | 30fps | |
| | 15fps | |
| SOUND QUALITY | HIGH QUALITY | STEREO<br>SAMPLING RATE : 44KHz<br>QUANTIZATION BITS : 6bits |
| | NORMAL | MONAURAL<br>SAMPLING RATE : 22KHz<br>QUANTIZATION BITS : 16bit |
| | LOW QUALITY | MONAURAL<br>SAMPLING RATE : 8KHz<br>QUANTIZATION BITS : 8bits |

| RESOLUTION | SXGA | 1280×960pixel |
| --- | --- | --- |
| | XGA | 1024×768pixel |
| | VGA | 640×480pixel |
| FRAME RATE | 30fps | |
| | 15fps | |
| SOUND QUALITY | HIGH QUALITY | STEREO SAMPLING RATE : 44KHz QUANTIZATION BITS : 6bits |
| | NORMAL | MONAURAL SAMPLING RATE : 22KHz QUANTIZATION BITS : 16bit |
| | LOW QUALITY | MONAURAL SAMPLING RATE : 8KHz QUANTIZATION BITS : 8bits |

DIGITAL CAMERA ACCOMMODATING RECORDING MEDIA FROM OTHER DIGITAL CAMERAS

BACKGROUND OF THE INVENTION

1. Field of the Invention

This invention relates generally to digital cameras and, more particularly, to a digital camera for recording image data onto an unloadably loaded recording medium, such as a memory card or optical disk, and reproducing record data out of the recording medium.

2. Description of the Prior Art

The digital cameras have functions of reproducing compressed image data out of a recording medium and decompressing it into a decompressed image to be displayed on a monitor provided thereon. Some of the digital cameras have also a function of reproducing sound data out of a medium as above and outputting it via a speaker through predetermined signal processing.

Meanwhile, the parameters associated with the reproduced image and sound data vary in quality. The individual image sensors are quite different in respect of the parameter of resolution, e.g., pixel count ranges from as low as about 0.35 million to as high as nearly several hundreds of millions. In order to actually display reproduced images on a monitor, encoding has to be done so that the resolution can be matched to the image sensor. In dealing with motion image data, not only the quality of the resolution parameter but also the quality of the frame rate parameter should be taken into consideration. For motion image data, in some cases 15 still images constitute 1 second of motion image whereas in other cases 30 still images are required for 1 second of motion image. For proper speed reproduction, reproduction should be suited in frame rate. Furthermore, for reproducing sound data, the quality associated with this parameter, which may be expressed in terms of sampling rate or quantization bit count for conversion from an analog to digital signal, must be taken into account.

In this manner, the qualities of different digital cameras are greatly different from one to another in respect of resolution, frame rate, sound quality, and other parameters. However, as long as the still image, motion image or sound having been taken by one person's digital camera is reproduced on that camera, it is satisfactory to merely have a corresponding reproduce function to a recording function of the same camera.

However, today's digital cameras employ unloadable recording media, such as memory cards and magneto-optical disks. It is possible to commonly utilize only one recording medium between the digital cameras adopting a same scheme of recording media. This means that one can use on his or her digital camera a recording medium having been used on another's digital camera. However, if there is superiority or inferiority in parameter quality between these cameras, the data recorded by the digital camera implementing the superior parameter quality is impossible to reproduce on a digital camera implementing on inferior parameter quality. More specifically, if one digital camera has an image sensor with a resolution quality of XGA and the other digital camera has that of VGA, image data with XGA taken by the one digital camera cannot be reproduced on the other digital camera having no XGA-compatible encoding function.

SUMMARY OF THE INVENTION

It is therefore, a primary object of the present invention to provide a digital camera which can reproduce even an image signal taken by a superior performance of another digital camera.

A signal recording/reproducing apparatus according to the present invention, comprises: an input processing circuit for performing a corresponding input process to any one of qualities of N in kind on a signal externally fetched; a recorder for recording a first signal outputted from the input processing circuit to an unloadably loaded recording medium recorded with a second signal having a quality different from the qualities of N in kind; a reproducer for reproducing either one of the first signal or the second signal from the recording medium; a quality detector for detecting a quality of a signal reproduced by the reproducer; an output processing circuit for performing output processing of M in number corresponding to respective qualities of M in kind on the reproduced signal; and an enabler for enabling any one of the output processing of M in number based on a result of detection by the quality detector, wherein the N and the M are positive integers that satisfy N<M, and the qualities of M in kind including the quality of the second signal.

According to the present invention, when a signal is externally given, the input processing circuit performs corresponding input process to any one of the qualities of N in kind on this signal. The first signal outputted from the input processing circuit is recorded on the recording medium by the recorder. The recording medium herein is unloadably loaded and recorded with a second signal having a different quality from any of the qualities of N in kind. If a first signal or second signal is reproduced from the recording medium by the reproducer, the reproduced signal is supplied to the output processing circuit for performing corresponding output processing of M in number to the respective qualities of M in kind. On the other hand, the reproduced signal is detected in quality by the quality detector. The enabler enables any one of the output processing of M in number based on a result of detection by the quality detector.

Consequently, the reproduced signal is output-processed depending upon its quality, thus being properly outputted. Furthermore, N and M are positive integers that satisfy N<M, and the qualities of M in kind include a quality of the second signal. Accordingly, even when the second signal has a quality that the input processing circuit is not compatible with, a reproduced signal is properly outputted. That is, according to the present invention, it is possible to properly reproduce a signal having been recorded on the recording medium by an image recording/reproducing apparatus having a higher performance than the present apparatus.

In one embodiment of the invention, the first and second signals include respective ones of quality information, and the quality detector detecting a quality of the reproduced signal according to the quality information included in the reproduced signal.

In another embodiment of the invention, the input processing circuit includes an image sensor having a first resolution to shoot a subject, the first signal being an image signal having the first resolution. On the other hand, the second signal recorded on the recording medium is an image signal having a second resolution higher than the first resolution. In the output processing circuit, a first converter converts the first resolution image signal into a third resolution image signal, and a second converter converts the second resolution image signal into the third resolution image signal. Here, the third resolution is a resolution of the monitor that is lower than the first and second resolutions. A converter selector selects either one of an output of the first converter or an output of the second converter.

In another embodiment of the invention, the input processing circuit includes a microphone to intake an external sound and an input processor to perform signal processing with a first sound quality on a sound signal taken by the microphone. The first signal is a sound signal having the first sound quality. On the other hand, the second signal is a sound signal having a second sound quality superior to the first sound quality. In the output processing circuit, a first output processor performs corresponding output processing to the first sound quality, and a second output processor performs corresponding output processing to the second sound quality. A processor selector selects either one of the first output processor or the second output processor. As a result, a desired sound is outputted.

In still another embodiment of the invention, the input processing circuit includes an image sensor to shoot a subject at a first frame rate, the first signal being a motion image signal having the first frame rate. On the other hand, the second signal recorded on the recording medium is a motion image signal having a different second frame rate from the first frame rate. The first and second signals include respective ones of frame rate information, and the reproducer reproducing either one of the first signal or the second signal into a form in compliance with the frame rate information. Due to this, the motion image signal is reproduced at a desired rate.

A digital camera according to the present invention, comprises: an image sensor for shooting object at a first frame rate; a recorder for recording a corresponding first motion image signal having the first frame rate to a subject image shot by the image sensor onto an unloadably loaded recording medium recorded with a second motion image signal having a different second frame rate from the first frame rate; a selector for selecting a desired motion image signal; a detector for detecting a frame rate of the desired motion image signal; and a reproducer for reproducing the desired motion image signal into a form in compliance with the frame rate detected by the detector.

According to the present invention, a subject is shot by the image sensor at a first frame rate. A corresponding first image signal at the first frame rate to the shot subject image is recorded on the recording medium by the recorder. The recording medium herein is unloadably loaded and recorded with a second motion image signal having a different second frame rate from the first frame rate. If a desired motion image signal is selected by the selector, the desired motion image signal is detected in frame rate by the detector. The reproducer reproduces a desired motion image signal in a suited form for the detected frame rate. That is, the desired motion image signal is reproduced at normal rate.

In one embodiment of the invention, the first and second motion image signals include frame rate information, and the detector detecting a frame rate of the desired motion image signal according to the frame rate information.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

In this embodiment, a magnet-optical disk having a particular diameter is employed as a recording medium. In order to provide compatibility to between the cameras using the disk as a recording medium, a plurality of compatible modes are provided which are defined by resolution, frame rate and sound quality as shown in FIG. 5.

Figures 4, 5:
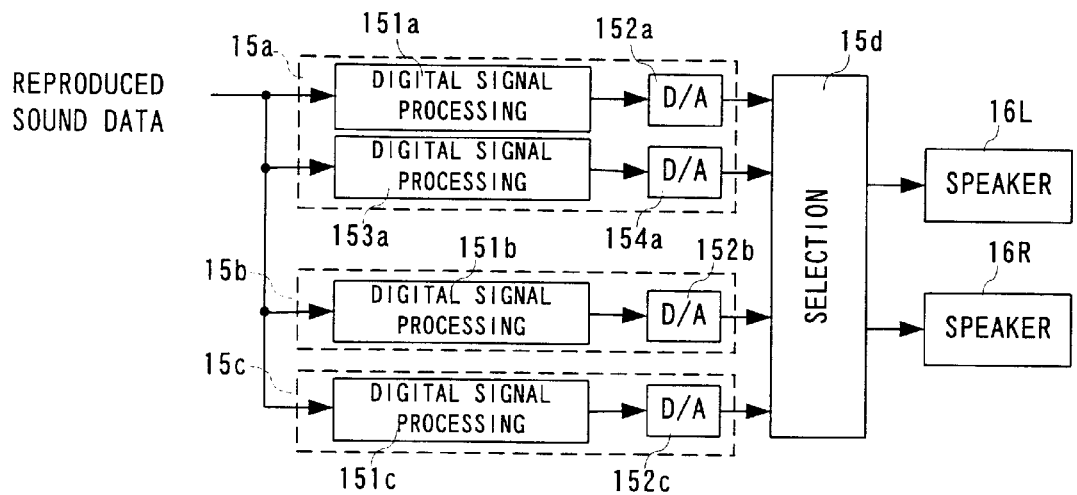
FIG. 4 is a block diagram showing a configuration of a sound reproduce processing circuit.
FIG. 5 is an illustrative view showing exemplary qualities associated with typical parameters of a reproduce system.

In other words, the digital camera parameters of resolution, frame rate, and sound quality, each of which vary in parameter quality as shown in FIG. 5, describe the signals from input processing circuits and the signals recorded on the magneto-optical disk, and the parameter qualities of the signals from the input processing circuits are not always the same parameter qualities of the signals recorded on the magneto-optical disks. The digital camera of the present invention has output processing circuits capable of processing signals recorded on magneto-optical disks which have parameter qualities that differ from the signals from the input processing circuits.

For resolution, at first, three compatible modes are provided, i.e. an SXGA mode having pixels in number of 1280×960, an XGA mode having pixels in number of 1024×768, and a VGA mode having pixels in number of 640×480.

For motion-image frame rate, two modes are provided, i.e. 30 fps to form 1 second of motion image with 30 still image frames, and 15 fps to form 1 second of motion image with 15 still image frames.

For sound quality, three modes are provided, i.e. high quality, normal quality and low quality. In a high quality mode, a stereo sound is available with a sampling rate of 44 kHz and a quantization bit count of 16 bits. In a normal mode, a monaural sound is available with a sampling rate of 22 kHz and a quantization bit count of 16 bits. In a low quality mode, a monaural sound is available with a sampling rate of 8 kHz and a quantization bit count of 8 bits.

Figure 1:
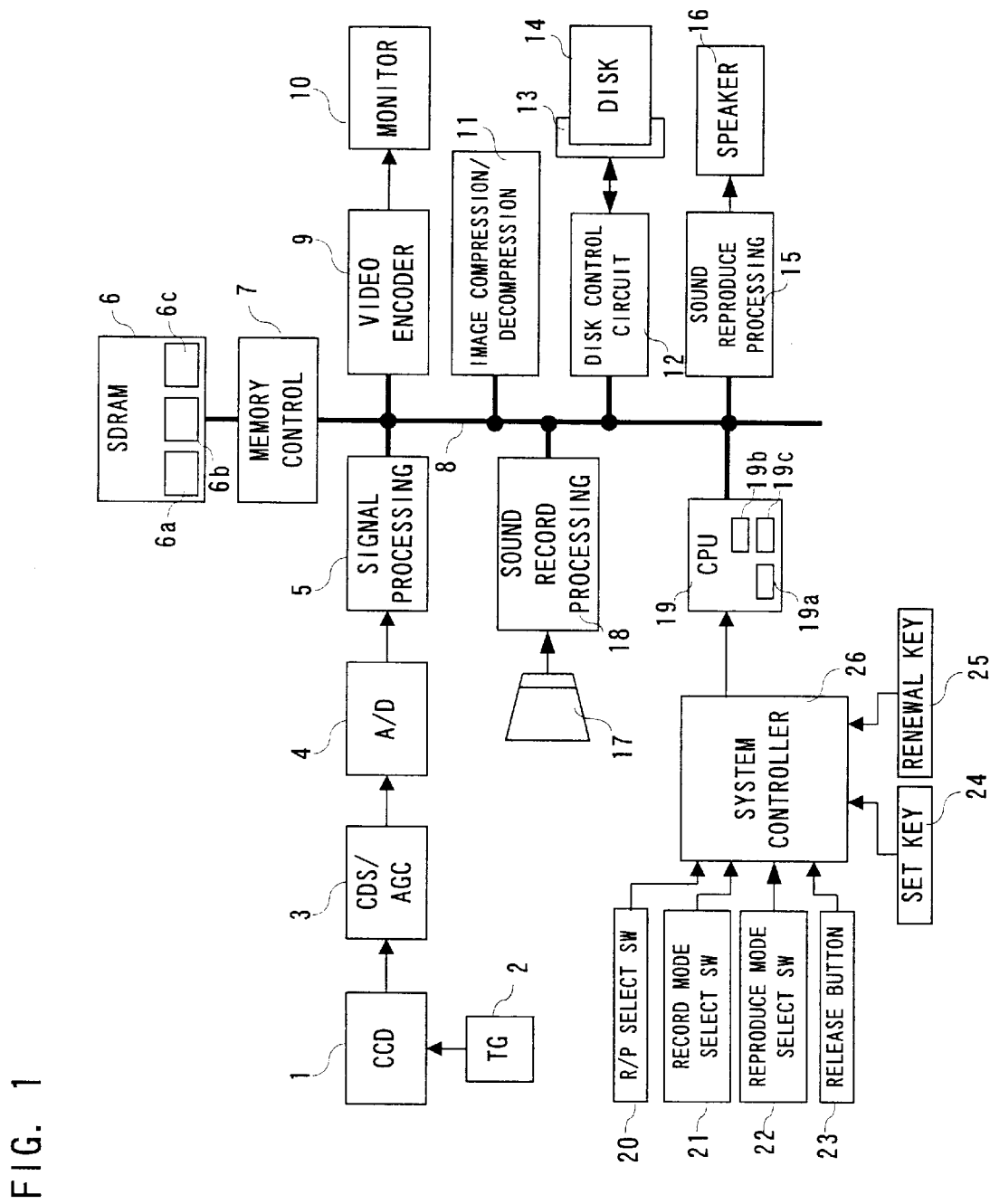
FIG. 1 is a block diagram showing one embodiment of the present invention.

FIG. 1 shows a digital camera of this embodiment. For a recording system, lowest levels are satisfied among the modes in resolution, the modes in frame rate and the modes in sound quality. That is, a CCD imager 1 is such a low-cost imager that outputs an imager signal of 640×480 pixels with a frame rate of 15 fps. Also, a digital signal processing circuit 5 is such a cheap circuit as for performing signal processing with a low frame rate, e.g. 15 fps. Furthermore, a microphone 17 is a monaural microphone. A sound recording circuit 18 is also such an inexpensive circuit as for creating a sound signal with low quality.

In FIG. 1, the CCD imager has a light receiving surface on which a subject optical image is incident 1 through a lens (not shown). The CCD imager 1 produces, by photoelectric conversion, a corresponding imager signal having 640×480 pixels to the subject image. The imager signal is outputted at a frame rate of 15 fps from the CCD imager 1 in response to a timing signal sent from a timing generator (TG) 2, and subjected to well-known noise removal and level adjustment by a CDS/AGC circuit 3, followed by being converted into a digital signal (imager data) by an A/D converter 4.

A signal processing circuit 5 is arranged in a rear stage of the A/D converter 4. The signal processing circuit 5, upon given a processing command from a CPU 19, performs well-known signal processing, such as color separation and YUV conversion, on the imager data outputted from the A/D converter 4, thereby creating image data having a luminance component (Y component) and a chrominance component (U component, V component) on a pixel-by-pixel basis. The created image data is delivered via a bus 8 to a memory control circuit 7. The memory control circuit 7 in turn temporarily store the image data into an image data storage area 6a of a SDRAM 6.

A video encoder 9 causes the memory control circuit 7 to read out the image data in the image data storage area 6a in response to a processing command sent from the CPU 19. The video encoder 9 fetches the read-out image data through the bus 8 and encodes it into a composite image signal of an NTSC format. The encoded composite image signal is supplied to a monitor 10 mounted on the camera main body. Herein, the monitor 10 has a screen with a resolution of approximately 0.11 million of pixels. The resolution of the monitor is lower than that of the CCD imager 1. The video encoder 9 performs conversion of resolution with the resolution of the monitor 10 taken into consideration.

An image compression/decompression circuit 11, upon receiving a compression command sent from the CPU 19, fetches 1 frame of image data out of the image data storage area 6a via the memory control circuit 7 and the bus 8, to perform image compression on it according to an JPEG format. Obtaining compressed image data, the image compression/decompression circuit 11 delivers the compressed image data to the memory control circuit 7 through the bus 8. The compressed image data is stored by the memory control circuit 7 onto a compressed data storage area 6b. On the other hand, the image compression/decompression circuit 11, when receiving a decompression command sent from the CPU 19, causes the memory control circuit 7 to read 1 frame of compressed image data out of the compressed data storage area 6b, and performs decompression processing on the read-out compressed image data according to the JPEG format. Obtaining the decompressed image data, the image compression/decompression circuit 11 stores the decompressed image data into the image data storage area 6a through the memory control circuit 7.

The sound record processing circuit 18, when given a processing command from the CPU 19, performs record processing on a sound signal of a predetermined time period that have been corrected by the monaural microphone 17. More specifically, the sound record processing circuit 18 performs sampling at a sampling rate of 8 kHz on $\frac{1}{15}$th of a second of monaural sound signal outputted from the monaural microphone 17, and then performs quantization by 8 bits into quantized data. The quantized data is subjected to well-known digital signal processing to produce low-quality digital sound data. The produced signal sound data is stored by the memory control circuit 7 into a sound data storage area 6c.

A sound reproduce processing circuit 15, when given a processing command from the CPU 19, reads out the sound data stored in the sound data storage area 6c through the memory control circuit 7. The sound reproduce processing circuit 15 performs predetermined reproduce processing on the read-out sound data and outputs the processed sound signal through a speaker 16.

The CPU 19 also performs by itself to record and reproduce image and sound data, in addition to issuance of the above-mentioned processing commands. The CPU 19, upon recording, reads out through the memory control circuit 7 the compressed image data stored in the compressed data storage area 6b and the sound data stored in the sound data storage area 6c, and delivers the compressed image data and sound data thus read, together with a record command, onto a disk control circuit 12. The compressed image data and sound data are recorded onto a magnet-optical disk 14. Meanwhile, the CPU 19, upon reproducing, issues a reproduce command to the disk control circuit 12 so that the disk control circuit 12 reads the compressed image data and sound data out of the magnet-optical disk 14. The CPU 19 writes through the memory control circuit 7 the read-out compressed image data and sound data respectively to the compressed data storage area 6b and the sound data storage area 6c.

Incidentally, the magnet-optical disk 14 is an unloadable recording medium and accessible, when loaded in a slot 13, by the disk control circuit 12.

A system controller 26 is connected with an R/P select switch to select either one of a record mode and a reproduce mode, a record mode select switch 21 to select either one of still image record mode or a motion image record mode, a reproduce mode select switch 22 to select either one of a still image reproduce mode and a motion image reproduce mode, a release button 23 to issuing a trigger for taking a picture of a subject, a set key 24 to instruct a start of motion image reproducing in a motion image reproduce mode, and a renewal key 25 to instruct a renewal of a reproduced still image in a still image reproduce mode.

When a record mode is selected by the RIP select switch 20, a system controller 26 supplies the CPU 19 with a key state signal that corresponds to a status in operation of the record mode select switch 21 and release button 23. On the other hand, when a reproduce mode is selected by the R/P select switch 20, the system controller 26 supplies the CPU 19 with a key state signal that corresponds to a status of the reproduce mode select switch 22, set key 24 and renewal key 25.

Figure 2:
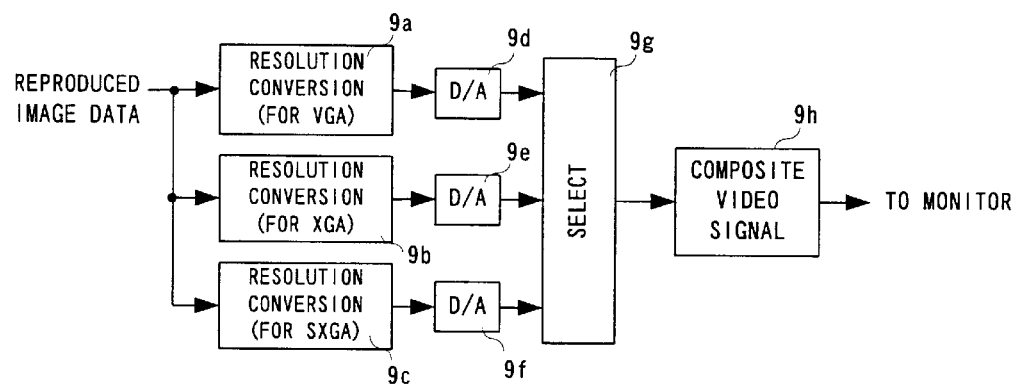
FIG. 2 is a block diagram showing a configuration of a video encoder.

The video encoder 9, in concrete, is configured as shown in FIG. 2. The image data read out of the image data storage area 6a of the SDRAM 6 is delivered to resolution conversion circuits 9a–9c. The resolution conversion circuit 9a is to convert a VGA resolution into a resolution on the monitor 10. The resolution conversion circuit 9b is to convert an SGA resolution into the resolution on the monitor 10. The resolution conversion circuit 9c is to convert an SXGA resolution into the resolution on the monitor 10. The image data outputted from the resolution conversion circuits 9a–9c is supplied to a select circuit 9g through D/A converters 9d–9f. The select circuit 9g selects any one of image signals outputted from the D/A converters 9d–9f according to a select instruction sent from the CPU 19. Specifically, when the input image data has a resolution VGA, the select circuit 9g selects an output of the D/A converter 9d. When the input image data has a resolution XGA, the select circuit 9g selects an output of the D/A converter 9e. When the input image data has a resolution SXGA, the select circuit 9g selects an output of the D/A converter 9f. The image signal thus selected is converted into a composite vide signal by a composite video signal producing circuit 9h. The composite video signal thus converted is then outputted onto the monitor 10.

Figure 3:
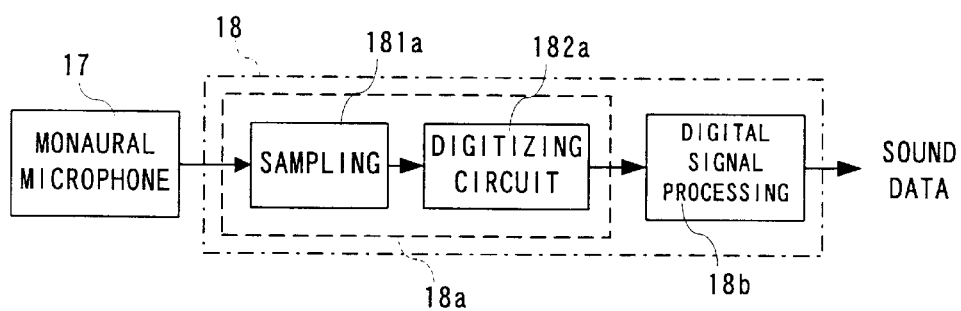
FIG. 3 is a block diagram showing a configuration of a sound record processing circuit.

The sound record processing circuit 18 is configured as shown in FIG. 3. The A/D converter 18 is configured by a sampling circuit 181a to perform sampling on a sound signal at a sampling rate of 8 kHz, and a digitizing circuit 182a to convert the sampled data into digital data at a quantization bit count of 8 bits. The output of the digitizing circuit 182a is subjected to well-known signal processing by the digital signal processing circuit 18b and then outputted as low-quality digital sound data.

The sound reproduce processing circuit 15 is configured as shown in FIG. 4. The sound data read out of the sound data storage area 6c of the SDRAM 6 is inputted to a high-quality reproduce system 15a, normal reproduce system 15b and low-quality reproduce system 15c. The high-quality reproduce system 15a is formed by a digital signal processing circuit for L-side sound 151a, a D/A converter 152a, a digital signal processing circuit 153 for R-side sound and a D/A converter 154a. The D/A converters 152a and 154a herein are designed to properly convert high-quality sound data having been sampled at a sampling rate of 44 kHz and quantized at a quantization bit count of 16 bits into an analog signal.

The normal reproduce system 15b is formed by a digital signal processing circuit for monaural sound 151b and a D/A converter 152b. The D/A converter 152b is designed to convert normal sound data having been sampled at a sampling rate of 22 kHz and quantized at a quantization bit count of 16 bits into an analog signal. The low-quality reproduce system 15c also is formed by a digital signal processing circuit for monaural sound 151c and a D/A converter 152c. The D/A converter 152 is designed to properly convert low-quality sound data having been sampled at a sampling rate of 8 kHz and quantized at a quantization bit count of 8 bits into an analog signal.

The select circuit 15d selects any one of outputs of the high-quality reproduce system 15a, normal reproduce system 15b and low-quality reproduce system 15c according to a select instruction sent from the CPU 19, and outputs it to the speakers 16L and 16R. More specifically, if the input sound data is high-quality sound data, the select circuit 15d selects L-side and R-side sound signals outputted from the D/A converters 152a and 154a, and outputs the L-side sound signal to the speaker 16L and the R-side sound signal to speaker 16R. On the contrary, when the input sound data is normal sound data, the select circuit 15d selects a monaural sound signal outputted from the D/A converter 152b and outputs it to the speakers 16L and 16R. When the input sound data is low-quality sound data, the select circuit 15d selects a monaural sound signal of from the D/A converter 152c and outputs it to the speakers 16L and 16R.

Explanation will now be made concretely on an operation of the CPU 19, with reference to FIG. 6 to FIG. 14. In these figures, FIG. 6 to FIG. 9 show an operation for a case that a record mode is selected, and FIG. 10 to FIG. 14 show an operation for a case that a produce mode is selected.

Figure 6:
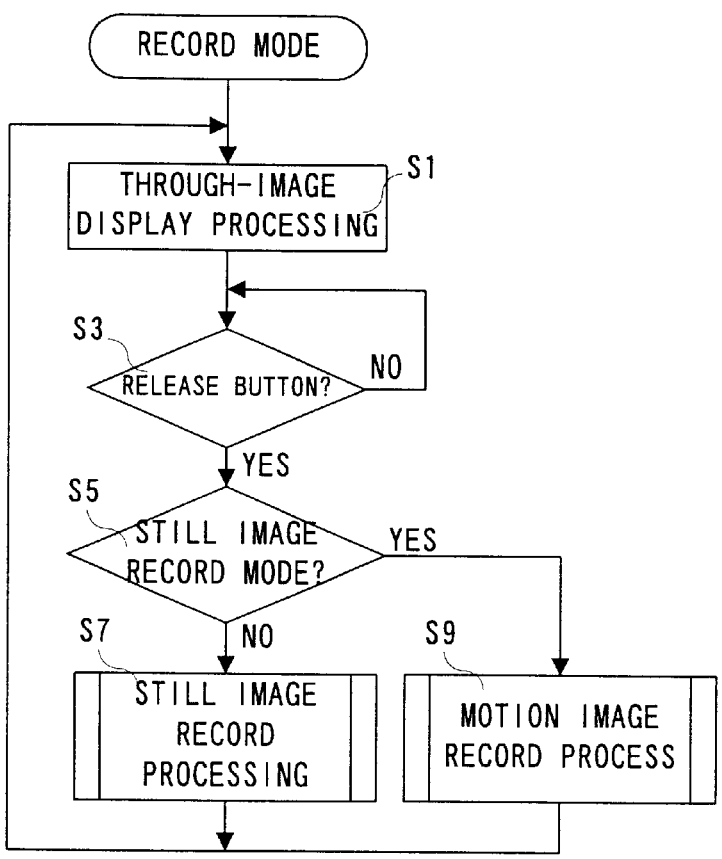
FIG. 6 is a flowchart showing part of operation of the present embodiment.

Referring first to FIG. 6, in step S1 through-image display processing is made. In this case, the TG2 is given a read instruction while the signal processing circuit 5 and video encoder 9 are respectively given processing commands. Furthermore, the select circuit 9g of FIG. 2 is given a command to select an output of the D/A converter 9d. As a result, subject motion images are displayed real-time on the monitor 10.

The CPU 19 then determines in step S3 whether the release button 23 has been pressed or not. If obtaining a determination result of "YES", the process advances to step S5. In step S5 it is determined whether the record mode currently selected is in a still image record mode or motion image record mode. If a still image record mode is selected, the process proceeds to step S7. When a motion image record mode is selected, the process proceeds to step S9. After completing the process of the step S7 or S9, the CPU 19 returns to step S1.

Figure 7:
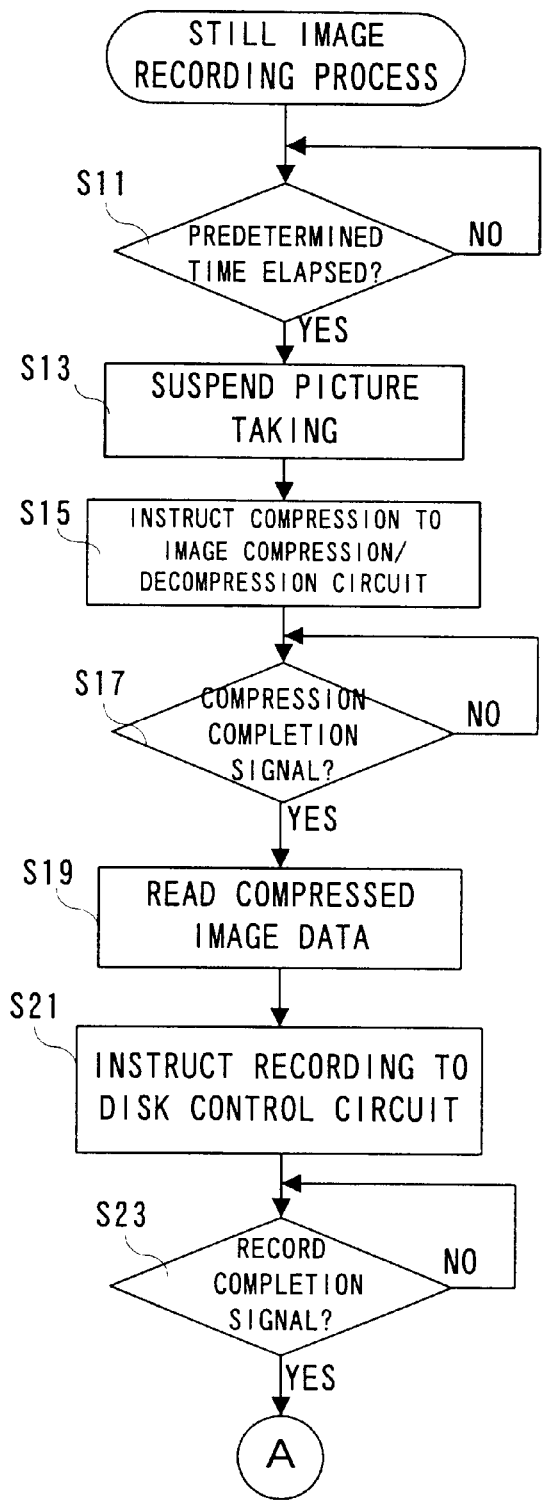
FIG. 7 is a flowchart showing another part of the operation of the present embodiment; FIG.
Figure 8:
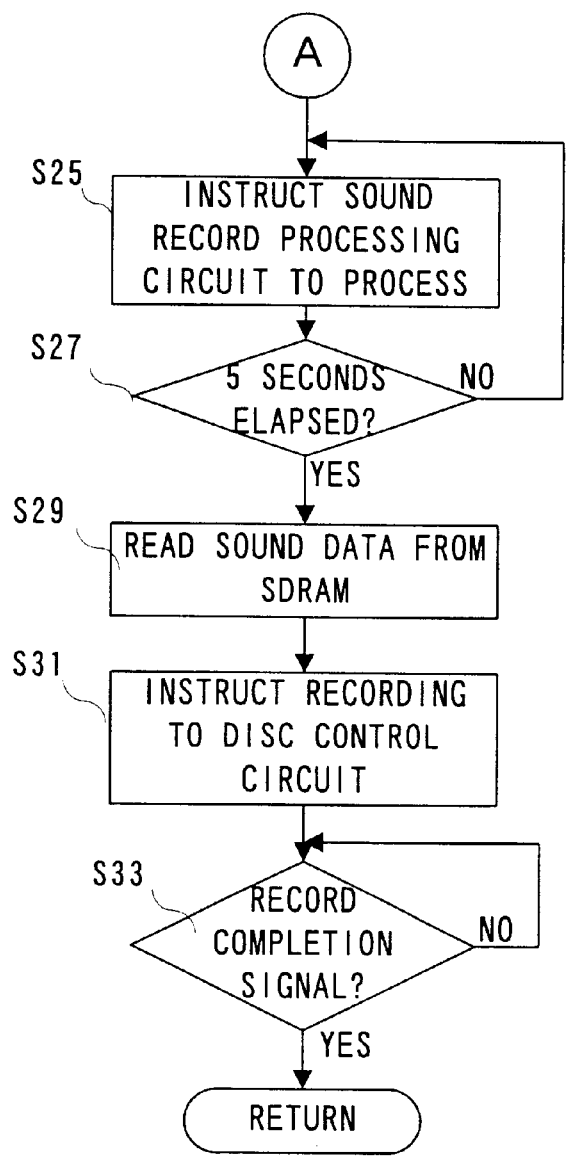
FIG. 8 is a flowchart showing still another part of the operation of the present embodiment.

In step S7 a subroutine shown in FIG. 7 is processed. First, in step S1 it is determined whether a predetermined time period has elapsed or not. If determined "YES", in step S13 a picture-taking process is suspended. The predetermined time period in step S11 corresponds to a time required for the image data (still image data) of a subject image upon operating the release button 23 to be processed through from a signal processing circuit 5 to an output. In step S13 the TG2 is given a read suspension command, and the signal processing circuit 5 is given a processing suspension command. Due to this, after operating the release button 23, only 1 frame of image data is obtainable.

The CPU 19 subsequently in step S15 provides a compression command to the image compression/decompression circuit 11. The 1-frame image data stored in the image data storage area 6a is subjected to JPEG compression by the image compression/decompression circuit 11. This produces compressed image data. The compressed image data produced is stored into the compressed data storage area 6b through the memory control circuit 7. The image compression/decompression circuit 11, each time completing a 1-frame compression process, generates a compression completion signal. In step S17 a presence or absence of a compression completion signal is determined. If determined "YES", in step S19 the compressed image data is read out of the compressed data storage area 6b. The CPU 19 thereafter in step S21 instructs the disk control circuit 21 to record the read-out compressed image data. At this time, the CPU 19 provides resolution information on "VGA" and a file no., together with a record command, to the disk control circuit 21. The disk control circuit 12, in turn, records the compressed image data, together with the resolution information "VGA" and file no. onto the magnet-optical disk 14. In the magnet-optical disk 14, a still image file is formed accommodating the compressed image data and having the resolution information and the file no. written in a header.

Incidentally, the digital camera in this embodiment produces only VGA-resolution image data. Accordingly, resolution information "VGA" is outputted in step S21.

When the still image file has been recorded, the disk control circuit 12 issues a record completion signal. In step S23 "YES" is determined in response to the record completion signal. Thereupon, the CPU 19 advances to step S25 to send a processing command to the sound record processing circuit 18. In response to the processing command, the sound record processing circuit 18 fetches ⅕sth of a second of a monaural sound signal from the monaural microphone 17, and converts the fetched sound signal into low-quality sound data. The converted low-quality sound data is written to the sound data storage area 6c through the memory control circuit 7. In step S27 it is determined whether 5 seconds have elapsed from starting the sound record processing or not. The sound record processing of step S25 is repeated until obtaining a determination result of "YES". The low-quality sound data is accumulated to 5 seconds onto the sound data storage area 6c.

After elapsing by 5 seconds, the CPU 19 advances from step S27 to step S29 to read 5 seconds of audio data out of the audio data storage area. Furthermore, the CPU 19 in step S32 instructs the disk control circuit 12 to record the 5-second audio data. This record instruction includes information of sound quality of "law quality" and a file no. same as that of the still image file recorded in step S21. The disk control circuit 12 records onto the magnet-optical disk 14 a sound file that accommodates the 5-second sound data and written in a header with the sound quality information and file no. Mutual relation is given through the file no. between a still image file accommodating the compressed image data produced responsive to an operation of the release button 23 and a sound file accommodating the sound data fetched after the operation of the release button 23.

The disk control circuit 12 also generates a record completion signal upon completing the sound data recording. When a record completion signal is generated, the CPU 19 in step S33 determines "YES" and returns to step S7 shown in FIG. 6. Thereafter, the CPU 19 returns to step S1. As a result, motion images are again displayed real-time on the monitor 10.

Figure 9:
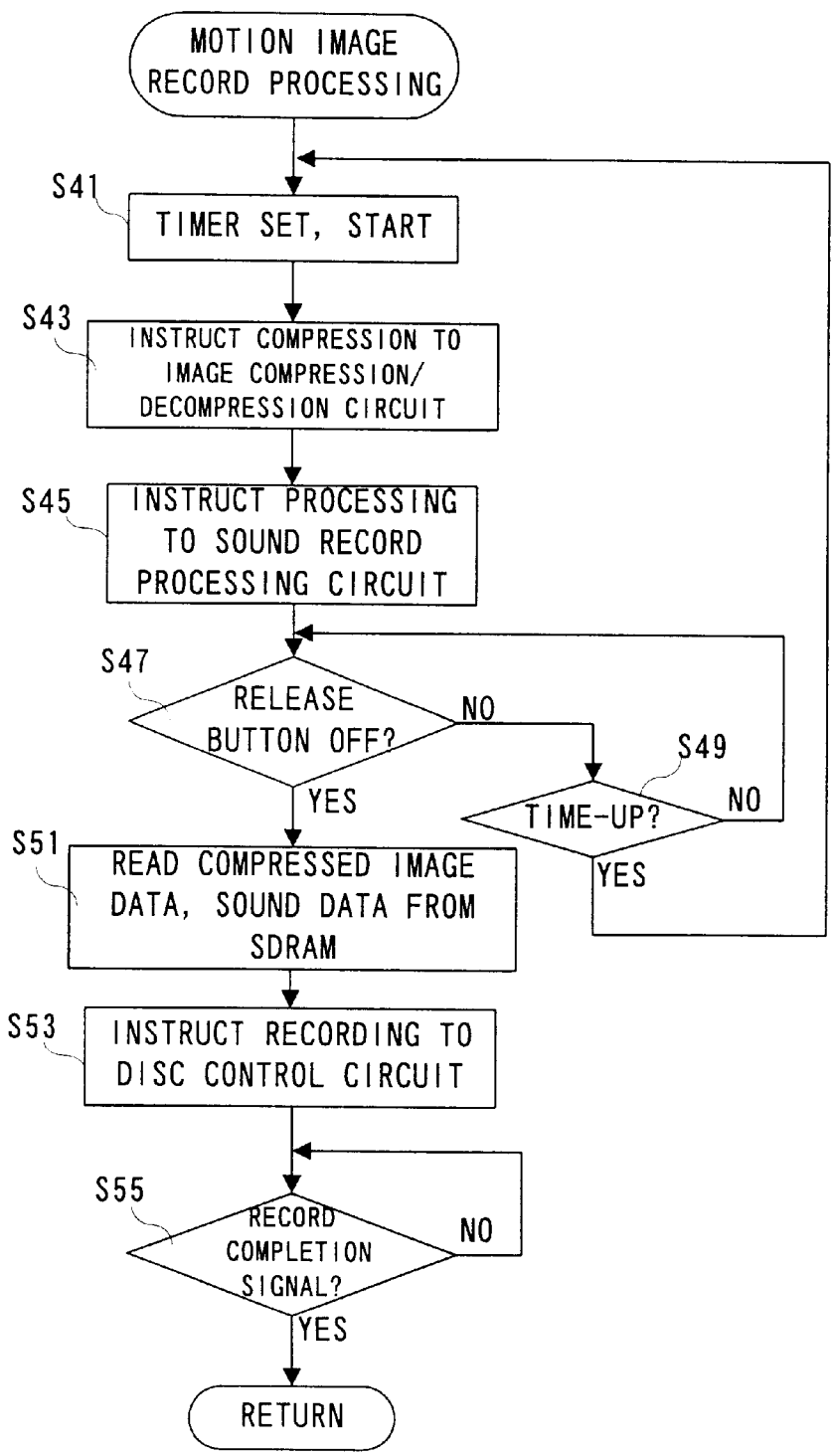
FIG. 9 is a flowchart showing yet another part of the operation of the present embodiment.

In step S9 a subroutine shown in FIG. 9 is executed. First, in step S41 a time period of ⅕sth of a second is set onto a timer 19a, and then the timer 19a is started. Next, in step S43 a completion command is given to the image compression/decompression circuit 11. In step S45 a processing command is sent to the sound record processing circuit 18. The image compression/decompression circuit 11 reads image data out of the image data storage area 6a and performs JPEG compression on it into compressed image data, and writes the compressed image data to the compressed data storage area 6b. Meanwhile, the sound processing circuit 18 converts the ⅕sth of second of sound signal inputted through the microphone 17 into low-quality sound data, and writes the converted low-quality sound data to the sound data storage area 6c.

In step S47 it is determined whether the release button 23 has been shifted off or not, and in step S49 it is determined whether the timer 19a has reached time-up or not. If the timer reaches time-up in a state the release button 23 is being pressed, the process returns to step S41 to repeat the above process. Due to this, until the release button 23 is released from the pressing state, a plurality of frames of compressed image data are successively accumulated onto the compressed data area 6b. Simultaneously, the related sound data to the compressed image data is accumulated to the sound data area 6c.

If the release button 23 is shifted off, then in step S51 compressed image data and low-quality sound data are read out respectively of the compressed data area 6b and the sound data area 6c. In step S53, the disk control circuit 12 is instructed to record these of data. At this time, the CPU 19 supplies resolution information of "VGA", sound quality information of "low quality", frame rate information of "15 fps" and a file no., together with a record command, to the disk control circuit 12. Due to this, the disk control circuit 12 forms in the magnet-optical disk 14 a motion image file that accommodates compressed image data and low-quality sound data and is written in a header with resolution information, sound quality information, frame rate information and a file no. This motion image file is prepared in an AVI (Audio Video Interleave) form or QUICKTIME form.

The disk control circuit 12, when the recording is completed, outputs a record completion signal. In response to this record completion signal, the CPU 19 returns from step S55 to step S9 shown in FIG. 6. The CPU 19 thereafter returns to step S1. As a result, real time motion images are again displayed on the monitor 10.

Figure 10:
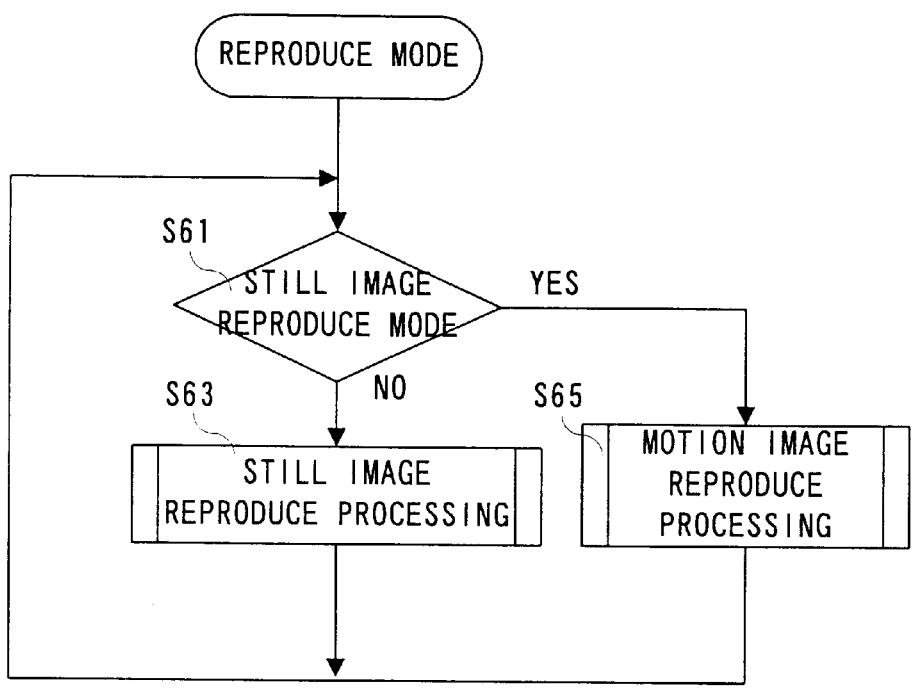
FIG. 10 is a flowchart showing another part of the operation of the present embodiment.

When a reproduce mode is selected, the CPU 19 first in step S61 of FIG. 10 determines whether either one is selected of a still image reproduce mode or a motion image reproduce mode. If a still image reproduce mode is selected, in step S63 a still image reproduce process is carried out. If a motion image reproduce mode is selected, in step S65 a motion image produce process is carried out. After ending the process of step S63 or S65, the process returns to step S61.

Figure 11:
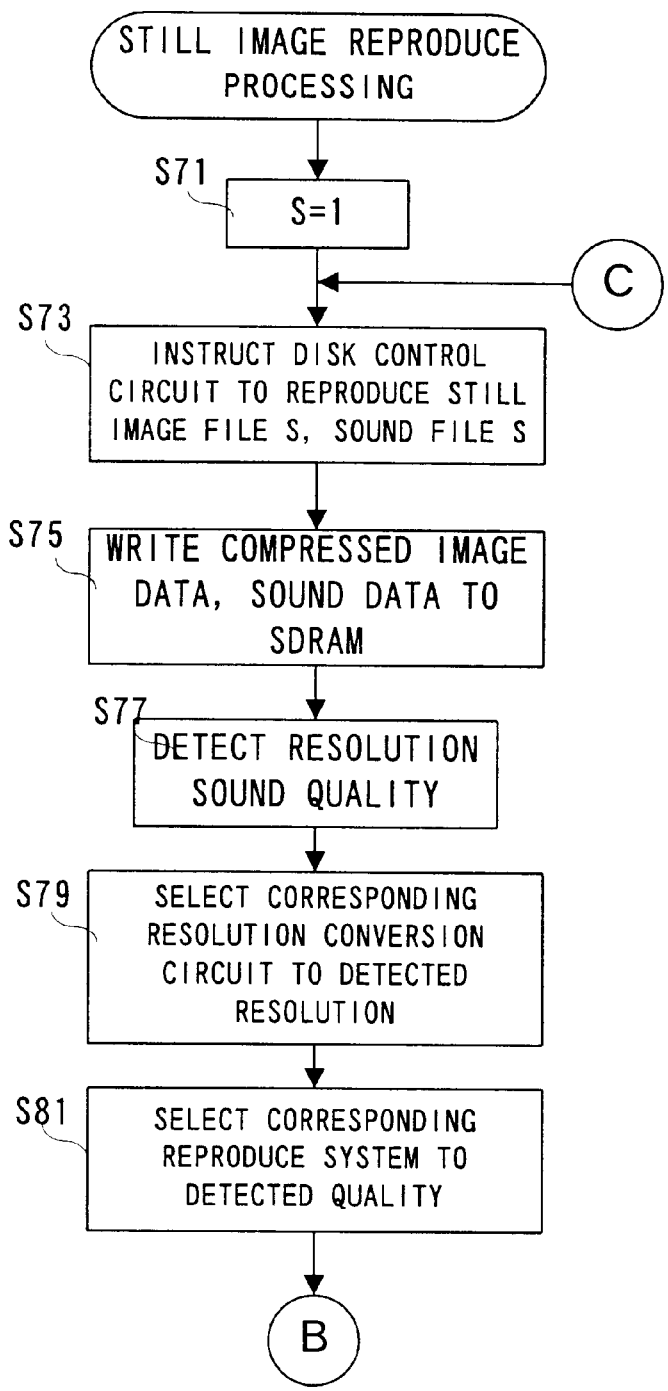
FIG. 11 is a flowchart showing still another part of the operation of the present embodiment.
Figure 12:
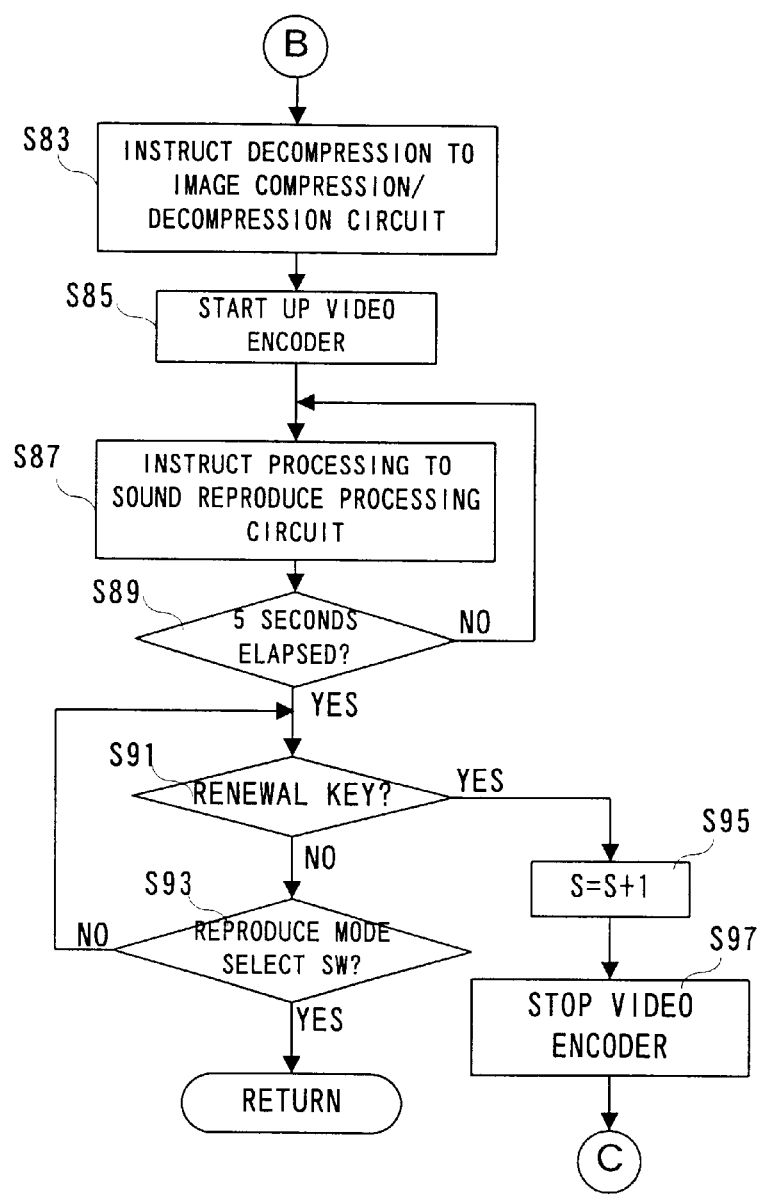
FIG. 12 is a flowchart showing yet another part of the operation of the present embodiment.

In a still image reproducing mode, a subroutine shown in FIG. 11 is executed. The CPU 19 first in step S71 sets a count value S of the counter 19b to "1", and then in step S73 instructs the disk control circuit 12 to reproduce a still image file S and sound file S. After reproducing a still image file S and sound file S, the CPU 19 in step S75 writes the compressed image data and sound data contained in these files, respectively, to the compressed data storage area 6b and the sound data storage area 6c. In step S77 resolution information is detected from the still image file S while sound quality information is from the sound file S.

In step ,S79, any-one of the resolution conversion circuits 9a–9c of FIG. 2 is selected based on the detected resolution information. Specifically, when the resolution information is, "VGA", the select circuit 9g is instructed to select an output of the D/A converter 9d. When the resolution information is "XGA", the select circuit 9g is instructed to select an output of the D/A converter 9e. When the resolution information is "SXGA", the select circuit 9g is instructed to select an output of the D/A converter 9f.

In the succeeding step S81, any one of the reproduce systems 15a–15c of FIG. 4 is selected based on the detected sound quality information. That is, when the sound quality information is "high quality", the select circuit 15d is instructed to select outputs of the D/A converters 152a and 154a. When the sound quality information is "normal", the select circuit 15d is instructed to select an output of the D/A converter 152b. When the sound quality information is "low quality", the select circuit 15d is instructed to select an output of the D/A converter 152c.

The magnet-optical disk 14 is unloadably loaded. There is a case that an XGA-resolution still image and high-quality sound have been taken on another digital camera are recorded to the magneto-optical disk 14. In such a case, it is impossible for the GVA resolution conversion circuit 9a to properly process image data with XGA resolution. Similarly, the low-quality reproduce system 15c cannot properly process high-quality sound data. In order to cope with this, this embodiment is further provided with an XGA-resolution conversion circuit 9b, an SXGA-resolution conversion circuit 9c, a high-quality reproduce system 15a and a normal reproduce system 15b. This makes it possible to properly reproduce image data having a higher resolution than the CCD imager 1 and sound data processed by a higher performance processing circuit than the sound record processing circuit 18.

The CPU 19 subsequently in step S83 sends an decompression command to the image compressed/decompression circuit 11, and in step S85 starts up the video encoder 9. In response to the decompression instruction, the image compression/decompression circuit 11 reads out compressed image data, and performs JPEG decompression on the read-out compressed image data. The decompressed image data is stored to the image data storage area 6a. The video encoder 9 reads out the image data stored in the image data storage area 6a to display a reproduced still image on the monitor 10. Because the compatible resolution conversion circuit with the image data is selected in step S79, the reproduced still image is properly displayed on the monitor 10.

The CPU 19 subsequently sends a processing command to the sound reproduce processing circuit 15. Thereupon, the sound reproduce processing circuit 15 reads ¹⁄₁₅th of a second of sound data out of the sound data storage area 6c, and outputs a corresponding sound to the read-out sound data through the speaker 16. In this case, the sound data has been processed by the reproduce system selected in step S81. Accordingly, sound is properly outputted through the speaker 16.

In step S89 it is determined whether a time period of 5 seconds has elapsed from a sound reproduction start or not. The process of step S87 is repeated until obtaining a determination result of "YES". As a result, continuous reproduction is made of 5 seconds of sound data stored in the sound data storage area 6c. If the time period of 5 seconds has elapsed and "YES" determination is made in step S89, the CPU 19 determines in respective steps S91 and S93 whether the renewal key 25 and the reproduce mode select switch 22 have been respectively operated or not. If the renewal key 25 is pressed, in step S95 the counter 19b is incremented and in step S97 the video encoder 9 is stopped, and the process returns to step S73. On the other hand, if the reproduce mode select switch 22 is operated; the process directly returns to step S63 shown in FIG. 10.

Figure 13:
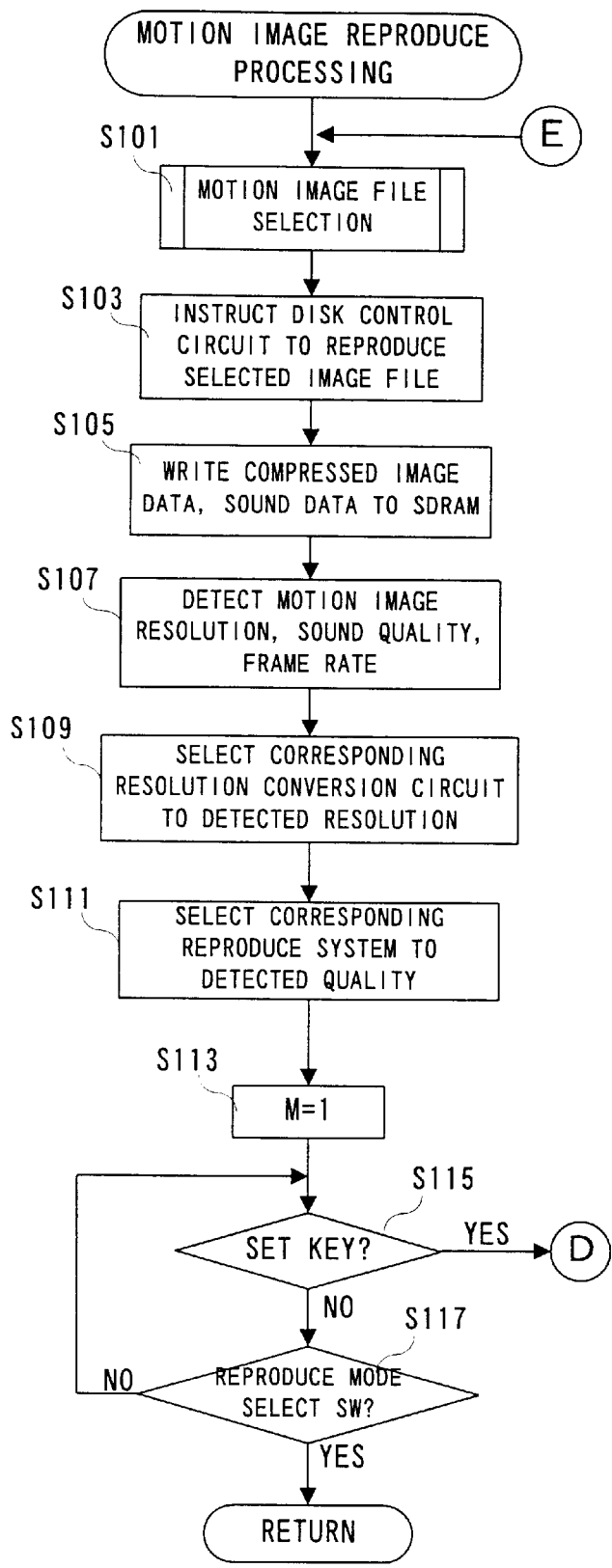
FIG. 13 is a flowchart showing another part of the operation of the present embodiment.
Figure 14:
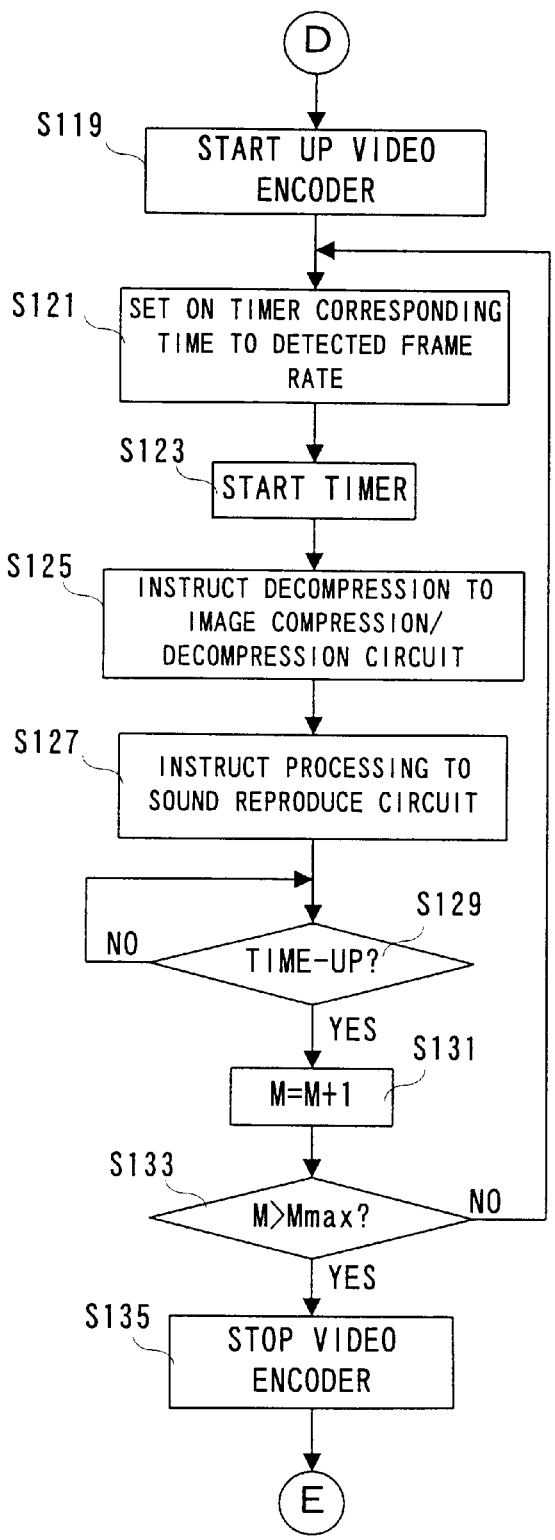
FIG. 14 is a flowchart showing still another part of the operation of the present embodiment.

In a motion image reproduce mode, a subroutine shown in FIG. 13 and FIG. 14 is executed. First in step S101 an image file select process is performed. If a desired motion image file is selected, in step S103 the disk control circuit 12 is instructed to reproduce the selected motion image file. In the succeeding step S105 the compressed image data and sound data contained in the reproduced motion image file are written through the memory control circuit 7, respectively, onto the compressed data storage area 6b and the sound data storage area 6c. After ending the writing, the process advances to step S107 to detect resolution information, sound quality information and frame rate information contained in the reproduced motion image file.

In step S109 any one is selected of resolution conversion circuits 9a–9c shown in FIG. 2 based on the detected resolution information. In step S101 any one is selected of the high-quality reproduce system 15a, the normal reproduce system 15b and the low-quality reproduce system 15c shown in FIG. 4 based on the detected sound quality information. For example, in the case that the resolution information represents "VGA" and the sound quality information shows "normal quality", the select circuit 9g of FIG. 2 in step S109 is given a command to select the D/A converter 9d, and in step S111 the select circuit 15d of FIG. 4 is given a command to select the D/A converter 152b.

In step S113 a count value M of the counter 19c is set to "1". In the succeeding steps S115 and S117, it is determined on a presence or absence of operation in the set key 24 and the reproduce mode select switch 22. If the set key is pressed, the process proceeds to step S119. If the reproduce mode select switch 22 is operated, the process returns to step S65 of FIG. 10.

In the case the process advances to step S119, the CPU 19 in this step starts up the video encoder 9, and in step S121 sets a corresponding time period to the detected frame rate information onto the timer 19a. For example, if the detected frame rate information is "30 fps", then 1/30 of a second is set onto the timer 19a. Completing the setting, the timer 19a is started in step S123, and thereafter in respective steps S125 and S127 the image compression/decompression circuit 11 and the sound reproduce processing circuit 15 are respectively given a decompression command and a processing command. The image compressed/decompression circuit 11, each time given a decompression command, reads 1 frame of compressed image data out of the compressed data area 6b and performs JPEG decompression thereon. The produced compressed image data is written to the image data area 6a. This decompressed image data is read out by the video encoder 9 and subjected to a resolution conversion process by the resolution conversion circuit having been selected in step S79. As a result, still image in a current frame is properly displayed on the monitor 10.

On the other hand, the sound reproduced processing circuit 15, each time given a processing command, reads a corresponding time period of sound data to 1 frame out of the sound data area 6c. The read-out sound data is subjected to reproduce processing by the reproduce system having been selected in step S101. As a result, sound is properly outputted through the speaker 16. Incidentally, the CPU 19 sends the detected frame rate information, together with a processing command, to the sound reproduce processing circuit 15. The sound reproduce processing circuit 15 in turn reads a corresponding time period of sound data to the 1 frame based on this detected frame rate information.

In step S129 it is determined whether the timer 19a has reached time-up or not. If when obtaining a determination result of "YES", the process advances to step S133 through a counter 19c increment process. In step S133 the current count value M is compared with the number of frames M max of the compressed image data contained in the motion image file, and the process of steps S121–S133 is repeated until M>Mmax is reached. If reaching M>Mmax, in step S135 a video encoder 9 is stopped and the process returns to step S101.

By the process of steps S121–S133, the compressed image data in each frame and sound data corresponding to 1 frame are reproduced in the order according to a time on the timer 19a. As a result, motion images are displayed varying at normal speed while sounds are outputted through the speaker 16 at normal speed.

As described above, the digital camera of this embodiment adopts the low quality CCD imager, signal processing circuit, microphone and sound record processing circuit, and can cope with only the lowest level of the compatible mode of FIG. 5. In contrast, the reproduce system is structured to satisfy all the compatible modes of FIG. 5. Accordingly, where a high-resolution image or high-quality sound taken on another digital camera is recorded on the magneto-optical disk 14, such an image and sound is possible to properly reproduce on the digital camera of the present embodiment.

Incidentally, in this embodiment the compatible modes were explained limited in resolution, frame rate and sound quality to those as shown in FIG. 5. However, the invention is never limited to them. That is, the compatible modes may be defined as two modes, i.e. an image compression mode to compress still image data according to a JPEG format and a non-compression mode not to perform any compression process at all.

Also, the motion image file in this embodiment was to be prepared in an AVI form or QUICKTIME form, the motion image file may be in an MPEG scheme.

Furthermore, the digital camera was provided with the processing circuits to cope with the lowest level of compatible modes. Alternatively, the digital camera may provided with a medium level or highest level of processing circuits, instead of the lowest level. It is possible to provide in the digital camera processing circuits to cope with two of the three levels. For example, it is possible to adopt a CCD imager shootable with XGA resolution in addition to VGA resolution thereby enabling recording an image with the lowest or medium level resolution, or to adopt a signal record processing circuit to perform sound processing with low and high two qualities thereby enabling low-quality or high-quality sound data creation.

Also, although the embodiment used the magnet-optical disk as recording medium, it is needless to say that a recording medium, such as a memory card, may be employed provided that it can be unloadably loaded onto the camera main body.

Furthermore, although the embodiment had a plurality of resolution conversion circuits in the video encoder to select a corresponding resolution conversion circuit to the resolution of reproduced image data, the resolution conversion circuit on the video encoder may be one in number so that parameters set on the circuit are variable depending upon resolution of reproduced image data. By doing so, it is possible to cope with a plurality of resolutions by use of one resolution conversion circuit. Also, although the sound data reproduce systems were prepared in plurality of number depending on the quality, a plurality of qualities can be dealt with by one reproduce system if varying the processing parameters each time reproduction is done.

Also, an image is displayed on the monitor simultaneous with turning on a power to the camera. It is however needless to say that a monitor on/off switch may be provided to display an image depending upon selection by an operator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal recording/reproducing apparatus, comprising:
    an input processing circuit for performing an input process on a signal externally fetched so as to output a first signal for a parameter having any one of N different parameter qualities;

a recorder for recording said first signal outputted from said input processing circuit to an unloadably loaded recording medium recorded with a second signal for said parameter having a parameter quality different from said N parameter qualities;

a reproducer for reproducing one of said first signal and said second signal from said recording medium;

a quality detector for detecting a parameter quality of a signal reproduced by said reproducer;

an output processing circuit for performing output processing on said reproduced signal so as to output a signal for said parameter having any one of M different parameter qualities; and an enabler for enabling any one of M output processing modes based on a result of detection by said quality detector, wherein said N and said M are positive integers that satisfy N<M, and said M parameter qualities including said parameter quality of said second signal.

2. A signal recording/reproducing apparatus according to claim 1, wherein said first and second signals include respective ones of quality information, and said quality detector detecting a parameter quality of said reproduced signals according to said quality information included in said reproduced signal.

3. A signal recording/reproducing apparatus according to claim 1, wherein said input processing circuit includes an image sensor having a first resolution quality to shoot a subject, said first signal being an image signal having said first resolution quality, said second signal being an image signal having a second resolution quality higher than said first resolution quality, and said output processing circuit including a monitor having a third resolution quality lower than said first and second resolution qualities, a first converter for converting said first resolution quality image signal into a third resolution quality image signal, a second converter for converting said second resolution quality image signal into said third resolution quality image signal, and a converter selector to select either one of an output of said first converter or an output of said second converter.

4. A signal recording/reproducing apparatus according to claim 1, wherein said parameter described by said first signal includes sound, said input processing circuit includes a microphone to intake an external sound and an input processor to perform signal processing with a first sound quality on a sound signal taken by said microphone, said first signal being a sound signal having said first sound quality, a second signal being a sound signal having a second sound quality superior to said first sound quality, and said output processing circuit including a first output processor to perform corresponding output processing to said first sound quality, a second output processor to perform corresponding output processing to said second sound quality, and a processor selector to select either one of said first output processor or said second output processor.

5. A signal recording/reproducing apparatus according to claim 1, wherein said parameter described by said first signal includes frame rate, said input processing circuit includes an image sensor to shoot a subject at a first frame rate;

said first signal being a motion image signal having said first frame rate, said second signal being a motion image signal having a second frame rate as a quality, said second frame rate differing from said first frame rate, said first and second signals including respective ones of frame rate information, and said reproducer reproducing either one of said first signal or said second signal into a form in compliance with said frame rate information.

* * * * *